United States Patent [19]

Pudelko et al.

[11] 4,318,075
[45] Mar. 2, 1982

[54] THICK-FILM POTENTIOMETER

[75] Inventors: Heinz Pudelko, Frankfurt am Main; Klaus Weber, Kronberg, both of Fed. Rep. of Germany

[73] Assignee: VDO Adolf Schindling AG, Frankfurt am Main, Fed. Rep. of Germany

[21] Appl. No.: 175,979

[22] Filed: Aug. 7, 1980

[30] Foreign Application Priority Data

Aug. 13, 1979 [DE] Fed. Rep. of Germany ....... 2932714

[51] Int. Cl.³ ............................................ H01C 10/32
[52] U.S. Cl. .................................... 338/162; 338/308; 338/314; 338/325
[58] Field of Search ................ 338/162, 140, 307–309, 338/154, 314, 324, 325, 320, 334, 128, 185, 182, 188; 29/620

[56] References Cited

U.S. PATENT DOCUMENTS 2,632,831  3/1953  Pritikin et al. ...................... 338/140
3,613,042  10/1971  Leerkamp ....................... 338/314 X
3,916,142  10/1975  Ennis .............................. 338/195 X Primary Examiner—C. L. Albritton
Attorney, Agent, or Firm—Martin A. Farber

[57] ABSTRACT

A thick-film potentiometer having a support substrate, particularly a ceramic substrate, onto which there is applied at least one resistance track of resistance composition which is electronically contacted via conductor lines on the support substrate at its ends and under circumstances at contact points therebetween and having a wiper track which extends along the resistance track and over which a wiper is swingable. The wiper track is formed of a plurality of the conductor lines which are narrow compared with the length of the wiper track and are arranged, spaced apart from each other, substantially at right angles to the wiper track, and the resistance track is arranged on the support substrate exclusively outside of the wiper track beyond and adjacent to the conductor lines.

13 Claims, 1 Drawing Figure

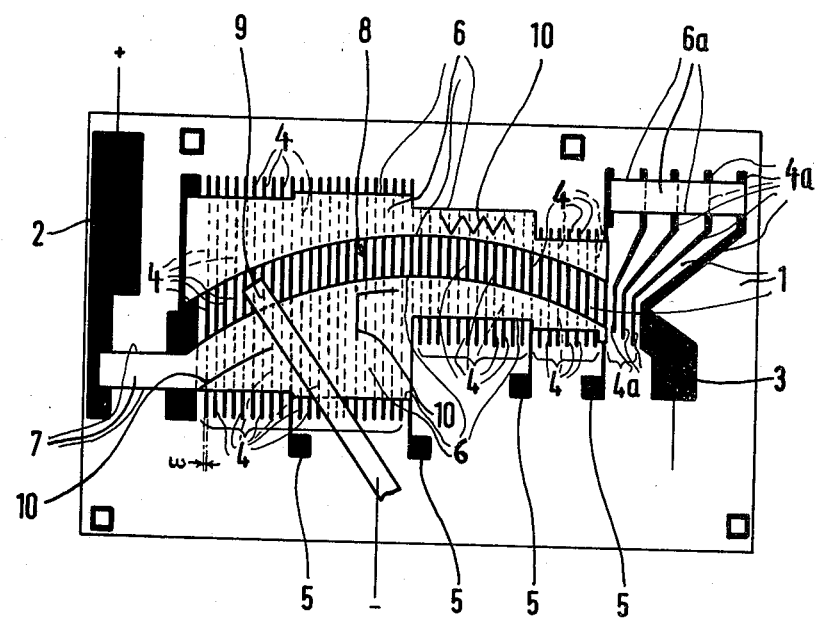

THICK-FILM POTENTIOMETER

The present invention relates to a thick-film potentiometer having a support substrate, particularly a ceramic substrate, onto which there is applied at least one resistance path of resistance composition which is contacted via conductive lines on the support substrate at least at its ends and possibly at fixed tapping points arranged between its ends, and having a wiper path which extends along the resistance path and over which a wiper is swingable.

In such known rotary resistors or potentiometers of thick-film type, the resistance path is provided also in the region of the wiper path above the contact paths. The wiper accordingly wipes on the resistance composition over the entire region of the wiper path.

This results in a number of in part serious disadvantages: In particular a contact resistance which is high in the case of high-ohmic resistance compositions must be expected between the resistance path and the wiper. In order not to permit the contact resistance to become too great, a sufficiently high contact bearing pressure of the wiper must be provided, as a result of which, in turn, excessive wear of the contact and of the resistance path must be expected, which in its turn affects the contact resistance. The characteristic curve of the potentiometer is considerably affected even in the event of relatively slight changes in the contact resistance, for instance as a result of contact wear, variable contact pressure or axial play. With a non-linear characteristic curve a non-flat wiper path is produced by crossings of the balance measurement points which are formed by the conductive paths and transitions between the resistance-film regions. Furthermore, a high varying noise resistance occurs. In mechanical respects, the desired relatively high contact bearing pressure requires a correspondingly high moment of rotation for the displacement of the potentiometer. Furthermore, only certain shapes of resistance-displacement characteristic can be produced, which limits the possibility of use of such potentiometers.

The object of the present invention is so to develop a potentiometer of the aforementioned type that this potentiometer has the lowest possible constant contact resistance between wiper and wiper path. In this connection, contact wear, change in contact pressure, axial play and similar disturbing influences are to have only a slight effect on the contact resistance. The potentiometer is to be characterized by low wear in the region of the wiper path and be adjustable by the application of the smallest possible moment of rotation. Finally, the cost of manufacture is to be low.

This object is achieved in accordance with the invention for a thick-film potentiometer of the aforementioned type in the manner that the wiper path (8) is formed of a plurality of conductor lines (4, 4a) which are narrow as compared with the length of the wiper path and which are arranged, spaced apart from each other, substantially at right angles to the wiper path, and that the resistance path (6, 6a) is arranged (entirely) outside of the wiper path above and adjacent to the conductor lines on the support substrate (1).

In this way the wiper path is shifted away from the resistance path to the conductor lines which are arranged adjacent to each other. Therefore in each case only individual conductor lines are in contact with the wiper. Due to the fact in particular that the conductor lines extend over the entire width of the resistance path, the entire resistance path is subdivided into small, discrete resistance sections each of which can be tapped, depending on the position of the wiper.

Substantially the following advantages are obtained by the potentiometer of the invention: As a result of the purely metallic contact between wiper and wiper path there are obtained only small, constant contact resistances, which are only slightly affected by contact wear, change in contact pressure and axial play. The metallic materials of the conductor lines and of the wiper can readily be so selected as to give good constant sliding properties of the wiper with only little wear. Only slight moments of rotation need be applied in order to adjust such a potentiometer. The noise resistance which is due to the contacting of the wiper remains slight. Since the mechanical properties of the resistance composition are not critical, cheap print pastes, for instance carbon-layer pastes, can be readily employed. In addition there is a simple possibility for temperature compensation, which will be discussed further below.

Another particular advantage of the invention in that the potentiometer can be designed for high power dissipation in compact structural size and that high-ohmic resistors can be obtained. Finally, all conceivable resistance-displacement characteristic curves can be obtained without difficulty.

In accordance with one particularly advantageous development of the potentiometer of the invention, the conductor lines (4, 4a) are arranged parallel to each other. By this arrangement of the conductor lines it is possible to obtain a particularly high resolution of the discrete steps between which resistance stages can be connected and disconnected. A potentiometer constructed with conductor lines arranged in this manner can have a characteristic curve which has only slight steps.

One suitable embodiment of the potentiometer is furthermore characterized by the fact that the resistance path (6) is arranged at right angles to the conductor lines (4) and approximately parallel to the wiper path (8).

In order to achieve a high power of resolution it is furthermore advantageous for the distance between two adjacent conductor lines (4) to be approximately equal to the width (w) of the conductor lines.

One particularly suitable dimensioning is for the conductor lines (4) to be each between 0.1 and 0.3 mm wide, and preferably 0.2 mm wide and to be arranged at a distance apart of between 0.1 mm and 0.3 mm, and preferably about 0.2 mm.

The equalizing of the characteristic curve of such a potentiometer advantageously resides in that for the equalization the resistance path (6) has at least one linear recess (10). The linear relief (10) can be effected advantageously in different manners as shown below. It can extend both approximately parallel to the wiper path as well as perpendicular thereto. The recess (10) is produced to particular advantage by means of a laser beam. Particularly fine equalization is possible with this laser beam. Another possibility consists in producing the recess by sandblasting.

For temperature compensation it is provided specifically that the conductor lines (4, 4a) and the resistance composition are made materials of opposite temperature coefficients.

The potentiometer on a support substrate can be formed in a particularly compact manner by arranging the wiper path (8) approximately in the center of the resistance path (6). Furthermore a curved wiper path is thus enclosed on both sides by the two halves of the resistance path (6).

While normally the conductor lines are the same distance apart over their entire length, in the advantageous embodiment in which they are arranged parallel to each other, it is also possible, in order to lengthen the resistance path, for the conductor lines (e.g. 4a ) to be parallel to each other in the region of the wiper path and also parallel to each other in the region of the resistance path but to extend radially in a region located between them.

It has proven particularly suitable to make the conductor lines and the resistance path or paths of materials which are of low diffusibility with respect to the corresponding other material. In this way the result is obtained that only slight changes in the resistances are produced during manufacture and in d thus a particularly high resolution of the measurement value.

The use of a resistance material consisting of a ruthenium compound and of a gold-palladium compound for the conductor lines has proven advantageous since in this case diffusion of the material of the conductor line into the resistance material takes place only to an extremely small and negligible extent. Since gold-palladium compounds, however, are relatively expensive, it is advisable to use a resistance material consisting of a ruthenium compound and a silver-palladium compound for the conductor lines. While it is true that there is a noticeable diffusion of silver into the resistance composition with this combination of materials, nevertheless the changes in resistance caused thereby remain within acceptable limits if the distances between the conductor lines are not too small, i.e. about 0.2 mm. Instead of a silver-palladium compound other silver compounds can also be used provided that they do not have too high a proportion of silver—up to about 30%—and are suitable for the thick-film technique.

The invention will be described below with reference to a drawing in which a thick-film rotary resistor is shown on an enlarged scale in top view.

A support substrate 1 consists of a ceramic material. On the support substrate, between two relatively wide conductor lines 2 and 3 which serve for contacting the potentiometer at the ends of the latter, there can be noted a structure of conductor lines 4 which are arranged very close to each other. Some of these conductor lines are provided with thickened contact surfaces 5. The conductor lines 4 extend parallel to each other over their entire length while the conductor lines 4a have parallel end sections and therebetween radially extending sections.

Across the conductor lines, a resistance path 6 is provided on the substrate, which substrate may consist of a resistance composition of ruthenium oxide. The use of a carbon layer paste as resistance composition is also possible but has the disadvantage that it is not resistant to gasoline or methanol and therefore cannot be used when the potentiometer is to be employed, for instance, in a gas gauge system. Corresponding to the desired characteristic curve for the potentiometer, the resistance path consists of sections of greater or lesser width which pass into each other. Aside from this, another small resistance path 6a is arranged outside the resistance path 6, not being directly in contact with it via the resistance composition. The resistance path 6 is subdivided in fine steps into individual resistors by the conductor lines 4 which extend parallel to each other. The subdivision of the resistance path 6a is also effected in fine steps, higher-ohmic sections being obtained here, however, with a given resistance composition since the conductor lines are further apart from each other in the region of the resistance path 6a. The resistance path is connected with the left-hand wide conductor path 2 via a base resistor 7.

It can be noted from the drawing that the resistance path 6 is subdivided by the wiper path 8 into an upper half and a lower half. The arcuate wiper path, which is shaped corresponding to the path of movement of the end of the wiper 9, thus extends substantially in the direction of the resistance path. The conductor lines, on the other hand, extend substantially perpendicular to the wiper path.

This potentiometer has the good electrical and mechanical properties which have been described above.

For equalizing or for obtaining the desired characteristic curve, which can be measured at the reinforced points 5, reliefs produced by laser beams are provided in the resistance path, the shape of which can be noted at reference numeral 10, for example.

We claim:

1. In a rotary potentiometer having a support substrate, particularly a ceramic substrate, onto which there is applied a plurality of conductor lines arranged adjacent to each other, a resistance track of resistance composition on the conductor lines, a portion of the conductor lines forming a wiper track which extends adjacent to along the resistance track and over which a contact point of a wiper is swingable in a curved path about an axis of rotation, the improvement wherein said conductor lines and said resistance track are films applied on the substrate in thick film technology construction, said conductor lines are narrow compared with the length of said wiper track and are arranged, spaced apart from each other, substantially at right angles to said wiper track, said resistance track is arranged on said support substrate exclusively outside of said wiper track upon and adjacent to said conductor lines, said conductor lines at least in the area of said wiper track are all arranged parallel to all of each other, the distance between every two adjacent of said conductor lines is approximately equal to the width of each of said conductor lines, said conductor lines have a rectangular flat surface facing the wiper on which the contact point of the wiper engages, at least a portion of said resistance track is arranged on both sides of said wiper track.

2. The thick-film potentiometer in accordance with claim 1, wherein said resistance track is arranged at right angles to said conductor lines and approximately parallel to said wiper track.

3. The thick-film potentiometer in accordance with claim 1, wherein said conductor lines are each between 0.1 and 0.3 mm wide and are arranged at a distance apart of between 0.1 mm and 0.3 mm.

4. The thick-film potentiometer in accordance with claim 3, wherein said conductor lines are disposed at a distance apart of 0.2 mm wide.

5. The thick-film potentiometer in accordance with claim 1, wherein
said resistance track is formed with at least one linear recess means for adjustment equalization.

6. With the thick-film potentiometer in accordance with claim 5, a method of producing the recess means comprising the step of
producing a recess in the resistance track by a laser beam.

7. The thick-film potentiometer in accordance with claim 1, wherein
said conductor lines and said resistance composition of said resistance track are made of materials of opposite temperature coefficients.

8. The thick-film potentiometer in accordance with claim 1, wherein
said wiper track is disposed approximately in the center of said resistance track.

9. The thick-film potentiometer in accordance with claim 8, wherein
said wiper track is enclosed on both sides by two halves of said resistance track.

10. The thick-film potentiometer in accordance with claim 1, wherein
said conductor lines and said resistance composition of said resistance track are of lower diffusibility compared to each other material.

11. The thick-film potentiometer in accordance with claim 10, wherein
said resistance composition is made of a ruthenium compound and said conductor lines are made of a gold-palladium compound.

12. The thick-film potentiometer in accordance with claim 10, wherein
said resistance composition is made of a ruthenium compound and said conductor lines are made of a silver-palladium compound.

13. The thick-film potentiometer in accordance with claim 1, wherein
said resistance track is sub-divided into rectangular surface portions defining a linear longitudinal center axis through all said surface portions intersecting said wiper track, the latter being arcuate about the axis of rotation of the wiper and being formed of said portion of said conductor lines spaced apart from one another without the resistance track therebetween, said conductor lines are exactly perpendicular to said longitudinal center axis of said resistance track.

* * * * *